(12) United States Patent
Mace et al.

(10) Patent No.: US 10,740,320 B2
(45) Date of Patent: Aug. 11, 2020

(54) SYSTEMS AND METHODS OF OPERATION LOCK MANAGEMENT AND SYSTEM CATALOG OVERRIDES IN DATABASE SYSTEMS

(71) Applicant: salesforce.com, inc., San Francisco, CA (US)

(72) Inventors: James E. Mace, San Francisco, CA (US); Atish Agrawal, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 195 days.

(21) Appl. No.: 16/135,242

(22) Filed: Sep. 19, 2018

(65) Prior Publication Data

US 2020/0089789 A1 Mar. 19, 2020

(51) Int. Cl.
  *G06F 17/00* (2019.01)
  *G06F 16/23* (2019.01)
  *G06F 9/48* (2006.01)
  *G06F 16/22* (2019.01)

(52) U.S. Cl.
  CPC ........ *G06F 16/2343* (2019.01); *G06F 9/4881* (2013.01); *G06F 16/2246* (2019.01); *G06F 16/2291* (2019.01); *G06F 16/2365* (2019.01)

(58) Field of Classification Search
  None
  See application file for complete search history.

(56) References Cited

U.S. PATENT DOCUMENTS

| 8,799,216 B1* | 8/2014 | McCline | G06F 16/2365 707/610 |
| 2011/0173154 A1* | 7/2011 | Chauvet | G06F 16/2343 707/610 |
| 2017/0308565 A1* | 10/2017 | Broll | G06F 16/2343 |

* cited by examiner

*Primary Examiner* — Anhtai V Tran
(74) *Attorney, Agent, or Firm* — Morris & Kamlay LLP

(57) ABSTRACT

Systems and methods are provided for a shared memory between a database system and a storage catalog server, which stores system catalog overrides and locks for at least a first workflow. The current system catalog overrides include at least a portion of the system catalog overrides and locks that are retrieved by the shared memory from the storage catalog server at a predetermined point in time. The database system performs a check of at least one of index validity and tenant validity for a second workflow or other database operation by checking a state of the corresponding tenant or index in the current system catalog overrides. The system catalog overrides suppress visibility of the respective system catalog changes when the database system determines that at least one of the index and the tenant is invalid based on the current system catalog overrides for the first workflow.

22 Claims, 8 Drawing Sheets

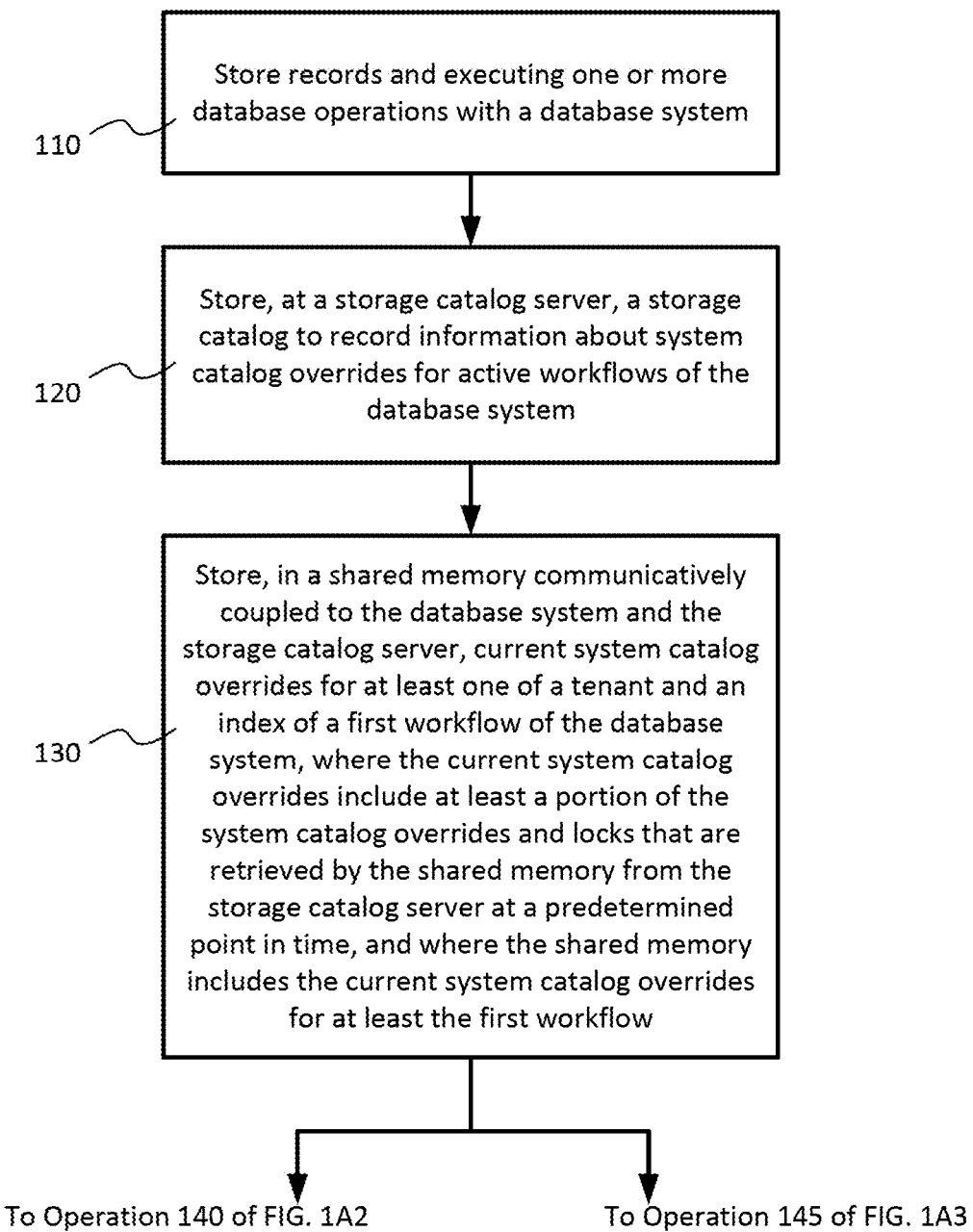
FIG. 1A1

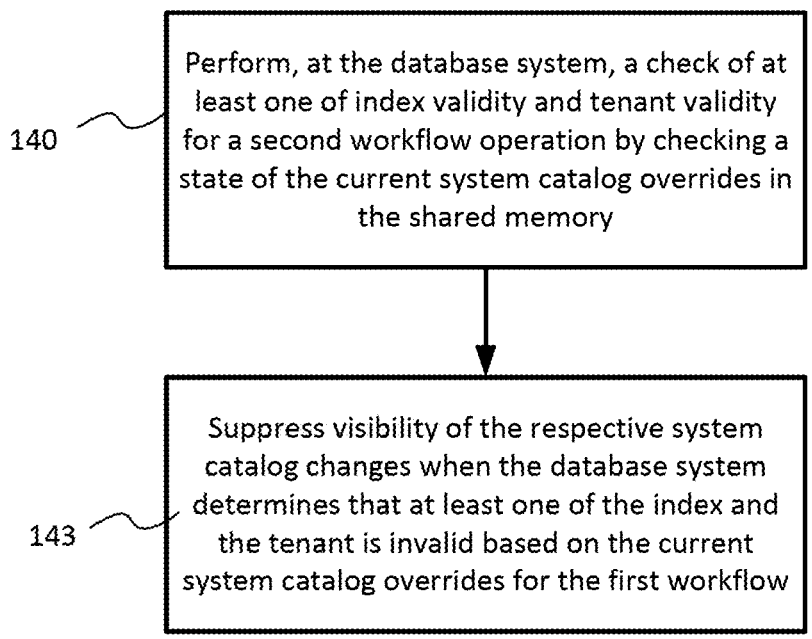
FIG. 1A2

FIG. 1A3
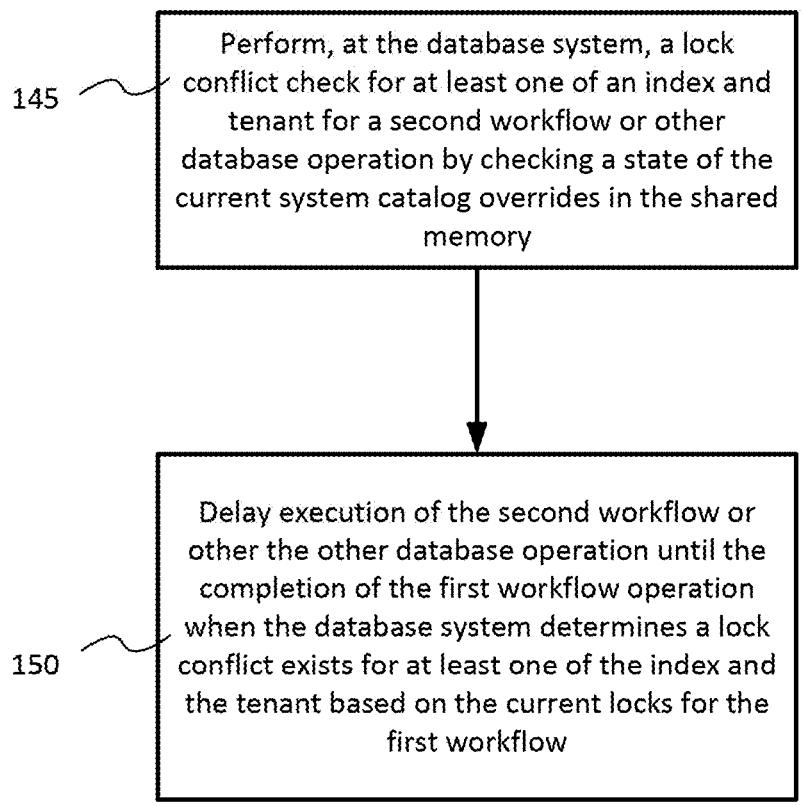

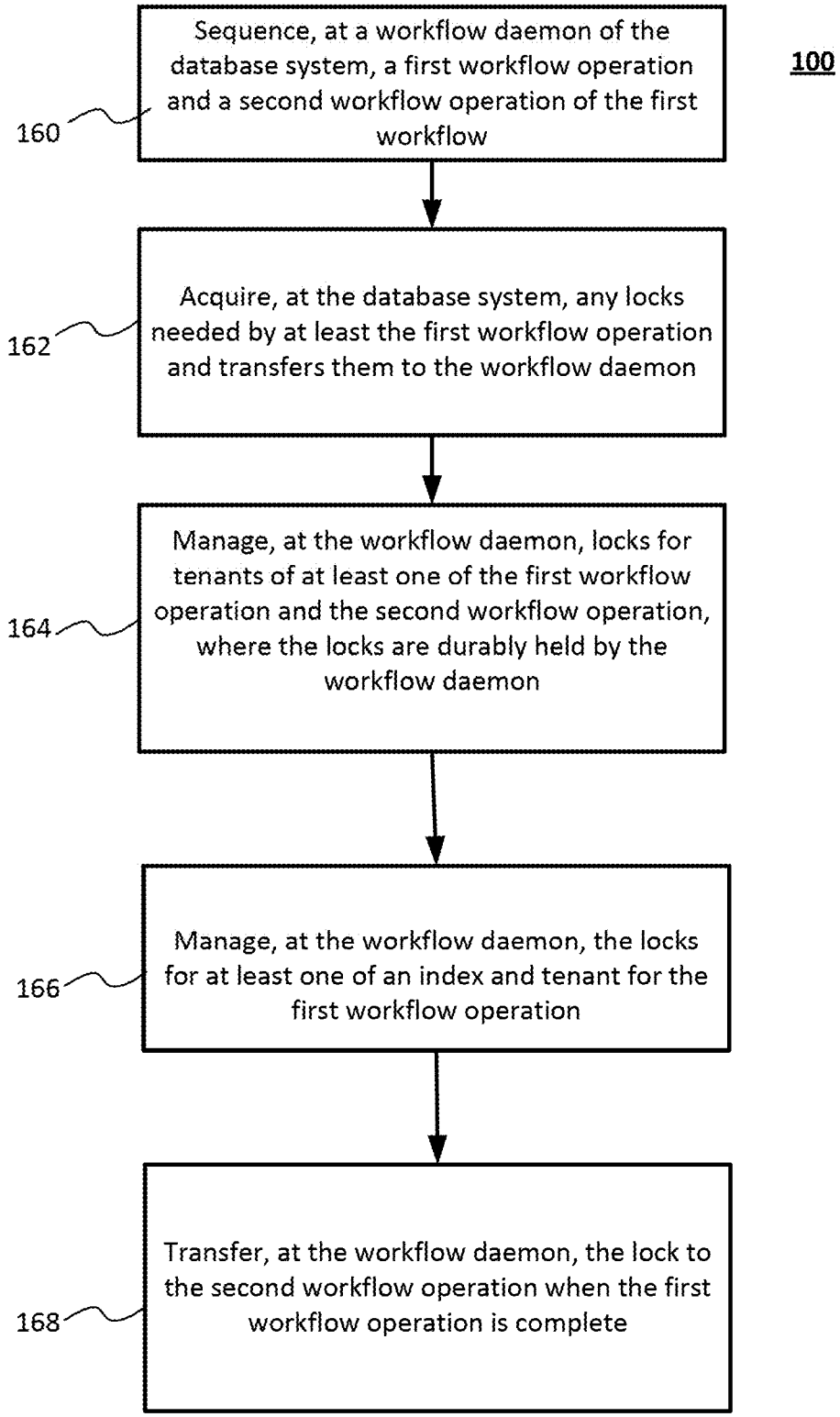

SYSTEMS AND METHODS OF OPERATION LOCK MANAGEMENT AND SYSTEM CATALOG OVERRIDES IN DATABASE SYSTEMS

BACKGROUND

Traditional database systems provide a database catalog having metadata in which definitions of database objects such as base tables, views (virtual tables), synonyms, value ranges, indexes, users, and user groups are stored. The database catalog is typically within the database system. The database system must retrieve information from the database catalog to perform database operations. The database catalog may also be stored in a separate catalog server.

Traditional database systems also provide locks on database operations, where a lock is acquired for a portion of an operation, and the lock is dropped when a portion of the operation is complete. That is, locks are acquired, dropped, and reacquired during the course of performing a database operation.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIGS. 1A1-1A2 show an example method of performing index or tenant validity checks for workflow operations by checking a state of the corresponding tenant or index in a current system catalog overrides of a shared memory according to an implementation of the disclosed subject matter.

FIG. 1A3 shows an example method of performing a lock conflict check in connection with the method shown in FIG. 1A1 according to an implementation of the disclosed subject matter.

FIG. 1B shows optional operations of the method shown in FIG. 1A1-1A3 to manage workflows and lock management according to an implementation of the disclosed subject matter.

FIG. 2 shows example of using a shared memory between a storage catalog server having a storage catalog, and a database system having a plurality of instances and backends according to implementations of the disclosed subject matter.

FIG. 3 shows a workflow and lock management example according to implementations of the disclosed subject matter.

DETAILED DESCRIPTION

Figure 2:
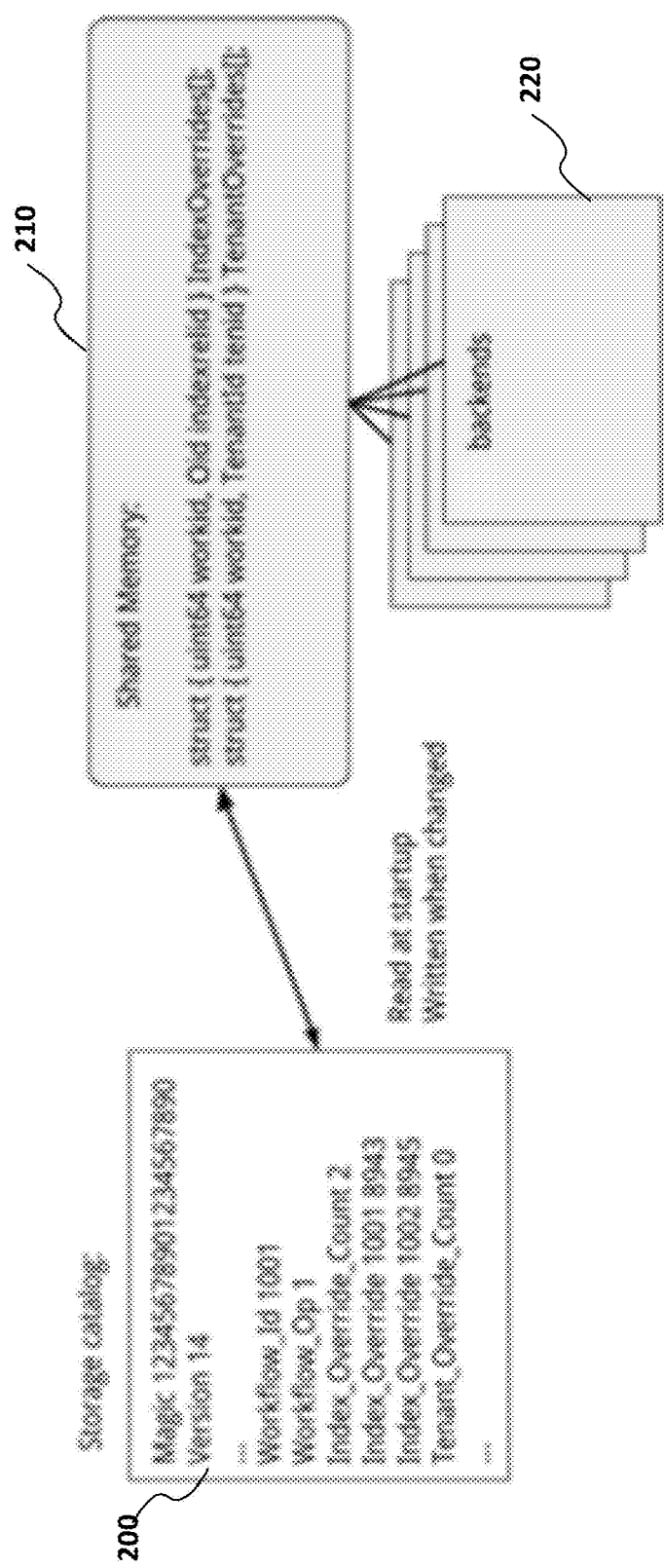

Implementations of the disclosed subject matter includes a shared memory between a database system and a storage catalog server. The shared memory stores current system catalog overrides for a workflow of a database system, where the current system catalog overrides include at least a portion of the system catalog overrides that are retrieved by the shared memory from a separate storage catalog server at a predetermined point in time. The storage catalog server includes a storage catalog to record information about the system catalog overrides for workflow operations of the database system. The database system performs index or tenant validity for workflow operations by checking a state of the corresponding tenant or index in the current system catalog overrides of the shared memory. The system catalog overrides may suppress visibility of the respective system catalog changes when the database system determines that at least one of the index and the tenant is invalid based on the current system catalog overrides for the first workflow.

The database system may perform a lock conflict check for at least one of an index and tenant for the second workflow or other database operation by checking a state of the current system catalog overrides in the shared memory. The database system may delay execution of the second workflow or the other database operation until the completion of the first workflow when the database system determines a lock conflict exists for at least one of the index and the tenant based on the current locks for the first workflow.

By using the shared memory, implementations of the disclosed subject matter reduce the amount of disruptive communications with the storage catalog server every time the database system performs an index or tenant validity check. In particular, overrides may reside in the shared memory associated with the storage catalog. The index or tenant validity may be determined based on checking the shared memory, thus eliminating the need to communicate with the catalog server. This reduces computational and communication overhead for the database system, while allowing operations to be completed before being recognizable by components of the database system.

In implementations of the disclosed subject matter, locks may be used to manage workflows, and a workflow daemon may manage and/or schedule workflow operations for the database system. Workflow operations may maintain locks to prevent incompatible concurrent operations, and locks may be tracked for the active workflow operations. Unlike the locks used in traditional database systems, the locks in the implementations of the disclose subject matter may be continuously held to prevent invalid interleaving of workflow operations so that there is no dropping and reacquiring of locks. Rather, lock ownership is transferred between workflow operations via the workflow daemon, which changes the lock ownership via the lock manager.

In some implementations, the system catalog overrides may be used to maintain consistency between a master database system (which may be known as a primary database) and disaster recovery (DR) database system. The system catalog overrides may suppress elements of the database schema until there is consistency between the master database system and the DR database system for an operation, and then releases the override. That is, the system catalog overrides stored in the shared memory may provide consistency between a master database system and DR database systems. The master database system and the DR database system have the same LSM (log-structured merge-tree) data, but may have different metadata stores.

In implementations of the disclosed subject matter, the storage catalog may maintain locks and system catalog overrides on behalf of an executing workflow, and may enforce them continuously until the workflow completes. The maintaining of the locks and system catalog overrides may include re-establishing locks and overrides for incomplete workflows at startup of the database system. The locks provide proper ordering of workflows relative to other workflows, as well as to other database operations. A workflow may include one or more operations, which may be referred to as workflow operations.

A workflow or operation that is blocked by a lock waits until the lock may be acquired. When the lock is transferred, the workflow or operation may be performed.

In implementations of the disclosed subject matter, the catalog overrides do not enforce ordering. Rather, the catalog overrides suppress visibility of one or more system catalog changes to other workflows and other database operations until the changes are complete. That is, the one or more system catalog changes may not be recognizable to the other workflows and other database operations until the changes are complete. This allows the database system to avoid stalling while awaiting completion of slow asynchronous operations affecting the system catalog. The combination of workflow managed locks and catalog overrides may provide fault-tolerant coordination of multi-step LSM metadata operations between the database and its associated storage catalog server, and/or minimizing lag when replicating these metadata operations.

Figure 3:
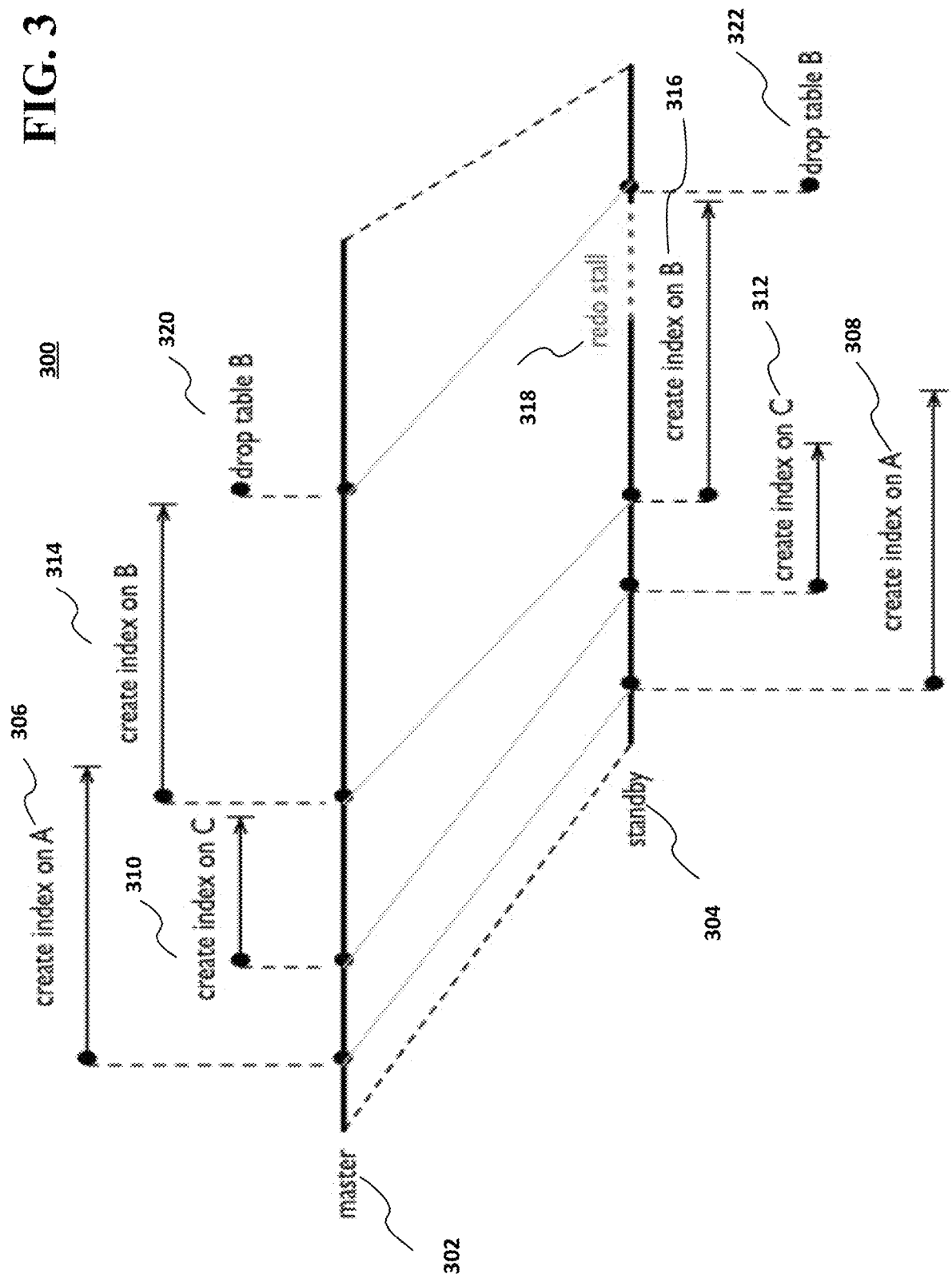

FIGS. 1A1-1A3 show an example method 100 for performing index or tenant validity for workflow operations by checking a state of the corresponding tenant or index in a current system catalog overrides of a shared memory according to an implementation of the disclosed subject matter.

Figure 4:
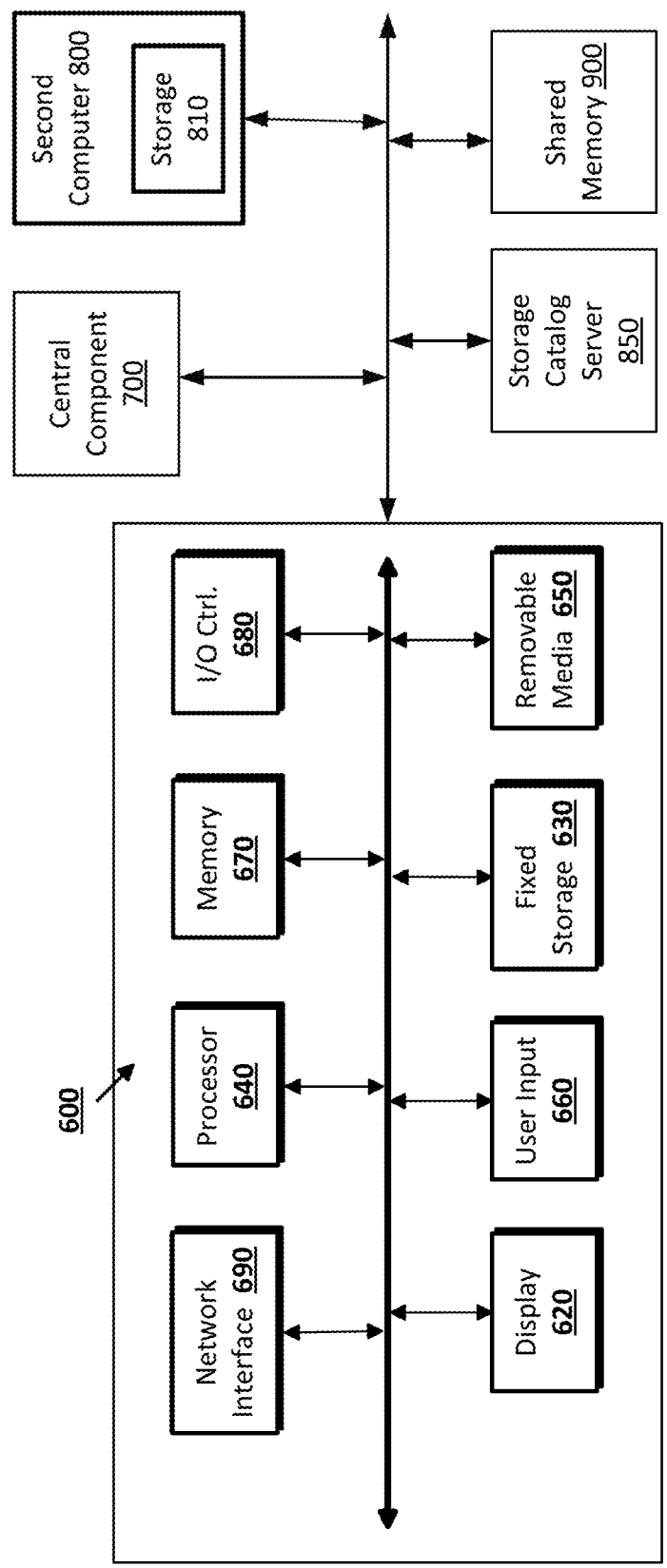
FIG. 4 shows a computer system according to implementations of the disclosed subject matter.
Figure 5:
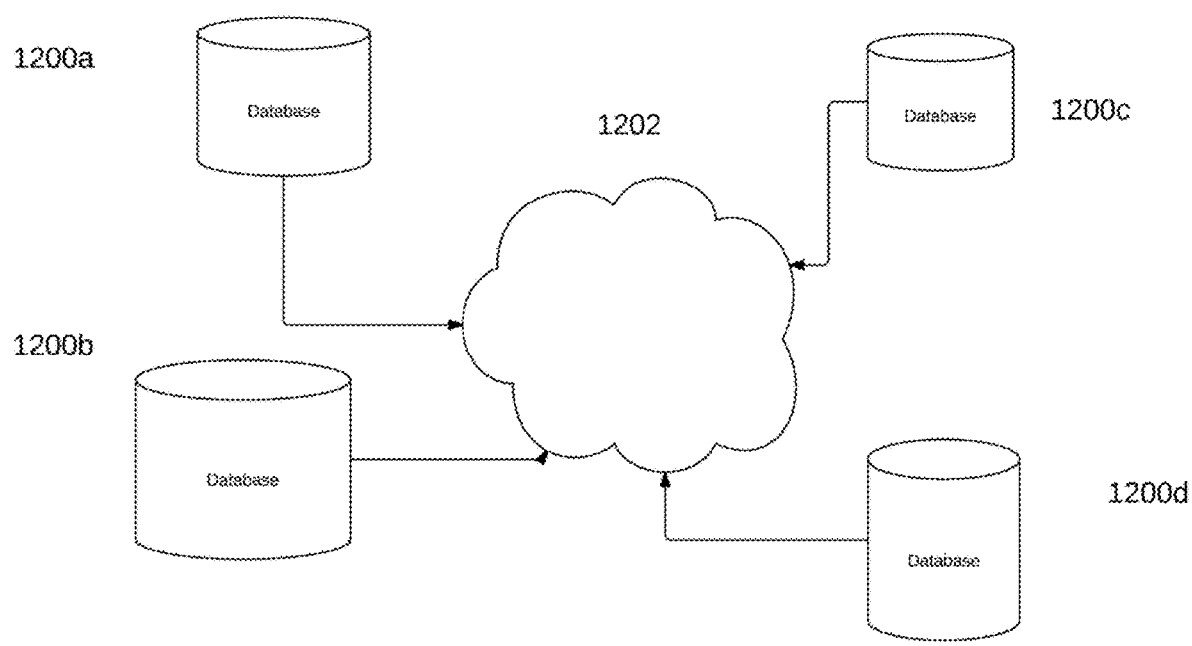
FIG. 5 shows a computer, servers and shared memory of a database system according to an implementation of the disclosed subject matter.

At operation 110, a database system (e.g., computer 600, central component 700, and/or second computer 800 shown in FIG. 4, and/or one or more of database systems 1200a-d shown in FIG. 5) may store records and execute one or more database operations. The database operations may include, for example: organization cloning (e.g., to create a copy of a tenant via metadata manipulations in the same database instance); instant org sandboxing (e.g., creating a copy of a tenant via metadata manipulations in a different database instance within the same storage substrate for one or more database instances); org sandboxing (e.g., creating a copy of a tenant in a different database instance, which may be in a different data center); org migration (e.g., moving a tenant's data to a different database instance, which may be in a different data center); online index construction (e.g., building an index on a relation without blocking access to the relation); fast failback (e.g., when recovering from a disaster recovery (DR) failover, where a read-only instance of the DR database system becomes a master for the database; the old master remains unavailable until it can be resynced with the new state of the database, only changed data needs to be copied back to the original database instance); creating DR standbys (e.g., create a database backup); upgrade (e.g., creating a new instance and taking ownership of storage catalog metadata and persistence); drop (e.g., truncation of tables and dropping of tables or indexes to slice out data), or any other suitable database operation.

At operation 120 a storage catalog server (e.g., storage catalog server 850 shown in FIG. 4 and described below) may store a storage catalog (e.g., storage catalog 200 shown in FIG. 2 and described below) to record information about system catalog overrides for active workflows of the database system. The storage catalog may include log-structured merge-tree (LSM) metadata associated with an instance of the database system, which may persist independently of the database system. The active workflows may include a first workflow and/or a second workflow. Each workflow may include one or more operations that modify a state of the database system, and/or that manipulate the LSM metadata. The system catalog may include the internal database catalog metadata and relations of the database system, and may be persisted through database logging and recovery systems. The system catalog overrides may include a request to suppress visibility of a particular system catalog change to prevent access to partially constructed database objects, including at least one of the tenants and the indexes.

At operation 130, current system catalog overrides for at least one of a tenant and an index of a first workflow operation of the database system may be stored in a shared memory (e.g., shared memory 900 shown in FIG. 4) communicatively coupled to the database system and the storage catalog server. The current system catalog overrides may include at least a portion of the system catalog overrides that are retrieved by the shared memory (e.g., the shared memory 900) from the storage catalog server (e.g., the storage catalog server 850) at a predetermined point in time. In some implementations, the predetermined point in time may when the storage catalog server is updated in response to LSM metadata changes (e.g., an LSM merge operation, a tenant creation operation, or the like). The predetermined point in time may include when the storage catalog may be rewritten when a workflow is started (e.g., either directly by a user performing a database operation, or indirectly by redoing a log record for the beginning of a workflow). The shared memory may include the current system catalog overrides for at least the first workflow.

The operations shown in FIGS. 1A2-1A3 may be performed concurrently with one another after operation 130, or may be performed sequentially (e.g., where the operations shown in FIG. 1A2 are performed, and then the operations shown in FIG. 1A3 are performed).

At operation 140 shown in FIG. 1A2, the database system may perform a check of at least one of index validity and tenant validity for a second workflow by checking a state of the current system catalog overrides in the shared memory. At operation 143, the respective system catalog changes may be suppressed when the database system determines that at least one of the index and the tenant is invalid based on the current system catalog overrides for the first workflow.

FIG. 1A3 shows an example method of performing a lock conflict check in connection with the method shown in FIG. 1A1 according to an implementation of the disclosed subject matter. At operation 145, the database system may perform a lock conflict check for at least one of an index and tenant for a second workflow or other database operation by checking a state of the current system catalog overrides in the shared memory. At operation 150, the database system may delay execution of the second workflow or other the other database operation until the completion of the first workflow operation when the database system determines a lock conflict exists for at least one of the index and the tenant based on the current locks for the first workflow.

FIG. 1B shows optional operations of the method 100 shown in FIG. 1A to manage workflows and lock management according to an implementation of the disclosed subject matter. Locks may be acquired in backends and transferred to the workflow daemon, which may be responsible for holding the locks, such as until the workflow completes. The backends may be processes executed by computer 600, central component 700, and/or second computer 800 shown in FIG. 4, and/or one or more of database systems 1200a-d shown in FIG. 5. A workflow daemon may be a process that serves as a resource owner, manager, and/or scheduler of workflow operations for the database system (e.g., computer 600, central component 700, and/or second computer 800 shown in FIG. 4, and/or one or more of database systems 1200*a-d* shown in FIG. 5). Held locks may be persisted in the storage catalog (e.g., storage catalog 200 shown in FIG. 2, of the storage catalog server 850 shown in FIG. 4), to allow them to be reacquired when, for example, the database system restarts.

In a lock transfer process, a donor process may acquire a lock to be transferred. The donor may initiate a transfer in shared memory (e.g., the shared memory 900 shown in FIG. 4). A donor process may signal a recipient process, and then may enter a sleep mode with a timeout. The recipient (e.g., the workflow daemon) may perform an operation to search for lock transfer requests. The recipient may then install locks and update a local state (e.g., to indicate that the locks have been installed). The recipient may signal the donor, which may wake up from the sleep mode. A similar process may be used to request the workflow daemon to drop a lock that it is holding on behalf of a workflow.

As shown in operation 160 of FIG. 1B, a workflow daemon of the database system may sequence a first workflow operation and a second workflow operation of the first workflow. That is, in this example, the first workflow may include the first workflow operation and the second workflow operation. At operation 162, the database system may acquire any locks needed by at least the first workflow operation and transfers them to the workflow daemon. At operation 164, the workflow daemon may manage locks for tenants or indexes of at least one of the first workflow operation and the second workflow operation, where the locks are durably held by the workflow daemon. At operation 166, the workflow daemon may manage the locks for at least one of an index and tenant for the first operation during the first workflow operation. At operation 168, the workflow daemon may transfer the lock to the second workflow operation when the first workflow operation is complete. A primary lock table may be stored in the shared memory. The primary lock table may track locks held by at least one of the first workflow operation and the second workflow operation. The locking operations shown in FIG. 1B and described above may be continuously held to prevent invalid interleaving of workflow operations. Rather than dropping and reacquiring locks as in some traditional systems, lock ownership may be transferred between workflow operations via the workflow daemon, which changes the lock ownership via the lock manager.

FIG. 2 shows example of using a shared memory between a storage catalog server having a storage catalog, and a database system having a plurality of instances and backends according to implementations of the disclosed subject matter. The backends may be database processes that acquire resources for a workflow and/or a workflow operation. These backend processes may be executed by computer 600, central component 700, and/or second computer 800 shown in FIG. 4, and/or one or more of database systems 1200*a-d* shown in FIG. 5. The storage catalog 200 may be stored in the storage catalog server 850 shown in FIG. 4 and described below. The storage catalog 200 may include workflow operation identifiers (e.g., Workflow_Id 1001), which may identify a particular workflow having one or more workflow operations. Workflows may be transitions between phases of a larger operation that spans multiple transactions in both the database system and the storage catalog (e.g., storage catalog 200, which may be stored in the storage catalog server 850 shown in FIG. 4). The storage catalog contents 200 may include workflow operations (e.g., Workflow_Op 1), index overrides (e.g., Index_Override 1001 8943, Index_Override 1002 8945), and/or tenant overrides (e.g., Tenant_Override_Count 0, which may indicate that the number of tenant overrides currently in the storage catalog is zero).

The shared memory contents 210 may be stored in the shared memory 900 shown in FIG. 4 and described below. The shared memory contents 210 may include index overrides and/or tenant overrides for one or more current workflows and/or workflow operations. The shared memory contents 210 may be retrieved from the storage catalog 200 of the catalog server 850 by the shared memory 900 by at least one predetermined point in time. In some implementations, the storage catalog 200 may be read by the shared memory 900 and stored in the shared memory 900 to form the shared memory contents 210. Any updates to the shared memory contents 210 based on one or more workflows and/or workflow operations may be written to the shared memory 900 and the storage catalog 200 of the catalog server 850. As shown in FIG. 2, one or more backends 220 of the database system (e.g., computer 600, central component 700, and/or second computer 800 shown in FIG. 4, and/or one or more of database systems 1200*a-d* shown in FIG. 5) may be communicatively coupled to the shared memory 900 that includes the shared memory contents 210. Backends 200 may be database processes that acquire resources for a workflow and/or workflow operation, transfer ownership of them to a workflow daemon, and initiates the workflow and/or workflow operation.

FIG. 3 shows a workflow and lock management example for a master database system and a disaster recover (DR) database system according to implementations of the disclosed subject matter. Most workflows may maintain locks on relations or on tenant identifiers to prevent incompatible concurrent operations. For example, the base relation for an index may be prevented from being changed or dropped while the index is being constructed. Locks may be used on workflows when moving between workflow states, when the workflow daemon may be managing multiple active workflows. Locks may be reacquired and/or transferred at startup before some incompatible operation could interfere with an active workflow.

As shown in FIG. 3, multiple online indexing operations 300 may be performed on a master database system (e.g., computer 600 and/or central component 700 shown in FIG. 4; and/or one or more of the database systems 1200*a-d* shown in FIG. 5) and a disaster recovery (DR) database system (e.g., second computer 800 and/or one or more of the database systems 1200*a-d* shown in FIG. 5). The DR database system may include a DR standby, which may be a read-only instance managing the DR copy of a production database (e.g., the master database system). The DR standby may receive and apply logs from its associated master, and may be able to service read-only queries. This shows the same portion of a log, which is generated in real-time on the master database system and replayed on the DR database system.

Workflows may avoid potential consistency problems and locking conflicts on the DR standby of the DR database system by being be constrained to start in the same order they did on the master database system. As shown in FIG. 3, the master database system indexing operations 302 may include: create index on A operation 306, create index on C operation 310, create index on B operation 314, and drop table B operation 320. The DR database system indexing operations 304 may be performed in the same order as the master database system indexing operations 302, and may include: create index on A operation 308, create index on C operation 312, create index on B operation 316, and drop table B operation 322.

Any locks needed by a workflow for the master database system indexing operations 302 may be identified, acquired, and communicated via a log so they may be reacquired for the DR database system indexing operations 304. In some implementations, a WORKFLOW BEGIN log record operation may perform this.

As shown in FIG. 3, the drop table B operation 322 of the DR database system indexing operations 304 may be blocked by the relation locks held by the ongoing create index on B operation 314 workflow of the master database system indexing operations 302. When redoing the DR database system indexing operations 304 as create index on B operation 316, the log records may be replayed faster than on the master database system, so there may be situations where a redo may stall (e.g., at redo stall operation 318 during the create index on B operation 316) until the locks can be acquired. As the DR database system may have a less interactive load than the master database system, it may have more available system resources to devote to log replay than the master database system, which may allow the DR database system to replay the log records faster. Implementations of the disclosed subject matter may provide a valid ordering of operations when replication redo stalls are performed as part of the DR database system indexing operations 304.

The workflow subsystem (e.g., the workflow daemon) may track locks on behalf of active workflows, and may have a persistent location for tracking the active locks. The storage catalog (e.g., storage catalog 200 shown in FIG. 2 of the storage catalog server 850 shown in FIG. 4) may be used for tracking system catalog overrides and to persist the lock data. In some implementations, locks may be promoted from transaction scope to session scope. That is, the lock may be held until explicitly released or the backend holding the lock terminates. The workflow daemon may maintain locks on behalf of the workflows it manages. The workflow daemon may reacquire held locks at startup and release them upon conclusion of workflow processing. In some implementations, locks on a workflow may be released earlier than upon conclusion of the workflow processing. Workflows may involve coordination of work across multiple transactions. A lock may only be needed for part of a workflow, such as for a storage space reservation workflow. The locks may be continuously held to prevent invalid interleaving of workflow operations which may occur with dropping and reacquiring locks.

In implementations of the disclosed subject matter, locks may be acquired by a workflow in the backend processing of a command that initiates the workflow. In this arrangement, stalls and deadlock kills (e.g., premature ending of a transaction) may only affect backend processes. These locks may be transferred to the workflow daemon by modifying their ownership within the lock manager. Successful return from a workflow-initiating function may indicate that the workflow has been initiated with all of its requested resources. The workflow daemon may hold the locks while operations are performed under the lock.

The management of workflows and locks as discussed above may be used to create a snapshot of a tenant of the database system. Creating snapshots for use in creating sandboxes may be disclosed, for example, in "FORMATION AND MANIPULATION OF TEST DATA IN A DATABASE SYSTEM," U.S. Patent Publ. No. 2018/0129585, which is incorporated by reference herein in its entirety. Creating snapshots may be used in connection with creating new tenants, such as disclosed in "SYSTEMS AND METHODS OF CREATION AND DELETION OF TENANTS WITHIN A DATABASE," U.S. patent application Ser. No. 15/634,786, filed on Jun. 27, 2017, which is incorporated by reference herein in its entirety. Creating snapshots may also be used in connection with database restore operations, such as disclosed in "SYSTEMS AND METHODS OF RESTORING A DATASET OF A DATABASE FOR A POINT IN TIME," U.S. patent application Ser. No. 15/634,796, filed on Jun. 27, 2017, which is incorporated by reference herein in its entirety.

Creating snapshots may include the operations of locking a tenant and locking an output snapshot to prevent interference from other workflows, waiting for the highest transaction number in persistence to be greater than or equal to the requested snapshot point, creating the snapshot, and releasing the locks.

In creating a snapshot, a workflow prologue operation may be executed, where code executing in a backend process of a database system (e.g., computer 600, central component 700, and/or second computer 800 shown in FIG. 4, and/or one or more of database systems 1200a-d shown in FIG. 5) may acquire resources needed by the workflow, transfer ownership of the resources to a workflow daemon, and initiate the workflow operations by posting the initial operation. In the workflow prologue operations for creating snapshots, a tenant identifier may be used to obtain access to a shared lock, and an exclusive lock may be accessed for the snapshot name. Locks may be transferred to the workflow daemon and persisted in the storage catalog (e.g., storage catalog 200 shown in FIG. 2, which is stored in storage catalog server 850 shown in FIG. 4). The master database system (e.g., computer 600 and/or central component 700 shown in FIG. 4, and/or one or more of database systems 1200a-d shown in FIG. 5) may post a create snapshot wait operation that includes the tenant identifier, a transaction number, and the snapshot name.

Upon completion of the prologue operation, in the master database system and the DR database system (e.g., the second computer 800 shown in FIG. 4 and/or one or more of database systems 1200a-d shown in FIG. 5), a wait operation (a create snapshot wait) may be performed with respect to a tenant identifier, a transaction number, and the snapshot name. When the highest transaction number in persistence is less than the snapshot transaction number, a sleep operation is performed, and the workflow daemon may retry later. The master database system may perform a creation of a snapshot operation based on the tenant identifier, snapshot transaction number, and snapshot name.

Performing the create snapshot operation may be based on the tenant identifier, snapshot transaction number, and snapshot name for the master database system and the DR database system. An extent reference set may be created based on the snapshot name for a tenant identifier at a snapshot transaction number. The extent reference set may include logical references to a physical extent that is stored in physical storage (e.g., a storage device), and may be used to virtualize access to the physical storage. Transaction number filtering may be used so that no records newer than snapshot transaction number are included in the snapshot, and extent pruning may be prevented so that no records are missing from the snapshot. The master database system may post either a success operation or a failure operation, depending on whether the snapshot was successfully created.

The master database system and the DR database system may have the workflow daemon execute an epilogue operation, which is code that may be executed in the workflow daemon that releases resources to be used by workflow operations, and may arrange for cleanup of a workflow table. An operation pointer may be set to zero, a lock release operation may be performed for the tenant identifier and for the snapshot name, lock persistence may be removed from the storage catalog, and remaining workflow metadata removed from storage catalog once a recovery starting position (RSP) advances. The RSP may be where log replay begins, for example, for crash recovery. That is, the remaining workflow metadata may be removed from the storage catalog once the database system has advanced to the point where there is no need to redo workflow operations during crash recovery.

Using the snapshot described above, a tenant may be created from the snapshot by locking the snapshot and locking the new tenant to prevent interference from other workflows. Operations for creating the tenant from the snapshot may include establishing a system catalog override for the new tenant, creating the new tenant, dropping the system catalog override, and releasing the locks.

In the workflow prologue operations for creating a tenant from a snapshot, the shared locks may be accessed using the snapshot name, and an exclusive lock may be accessed using a new tenant identifier. A system catalog override may be installed for the new tenant identifier. Locks and overrides may be transferred to the workflow daemon and persisted in the storage catalog (e.g., in storage catalog 200 shown in FIG. 2, which is stored at storage catalog server 850 of FIG. 4). The master database system may perform a tenant splice using the snapshot name and the new tenant identifier. The tenant splice operation may insert the tenant into an LSM of a database instance of the master database system and/or the DR database system.

Upon completion of the prologue operations, the master database system and the DR database system may perform a tenant splice operation using the snapshot name and the new tenant identifier. The new tenant identifier may be spliced into the LSM using the snapshot name. Splicing may be atomic, and failure of a splicing operation may leave the LSM unmodified. The master database system may perform a create tenant operation using the new tenant identifier when the splicing is successful, and may perform an operation when the splicing fails.

In the master database system, the new tenant may be created using the new tenant identifier. A row may be inserted into a pg_tenant table for the new tenant identifier, where the pg_tenant table is the system catalog relation describing the attributes of the tenant. The master database may post the success or failure of this new operation, and the workflow daemon may perform an epilogue operation.

In the epilogue operation, an operation pointer may be set to zero, and lock release operations may be performed by to new tenant identifier and for the snapshot name. The system catalog override may be removed for new tenant identifier. Lock and override persistence may be removed from the storage catalog, and remaining workflow metadata may be removed from the storage catalog when RSP advances.

Implementations of the presently disclosed subject matter may be implemented in and used with a variety of component and network architectures. FIG. 4 is an example computer 600 suitable for implementing implementations of the presently disclosed subject matter. As discussed in further detail herein, the computer 600 may be a single computer in a network of multiple computers. As shown in FIG. 4, the computer 600 may communicate with a central or distributed component 700 (e.g., server, cloud server, database, cluster, application server, etc.). The central component 700 may communicate with one or more other computers such as the second computer 800, which may include a storage device 810. In some implementations, the central component 700 may be a master database system, as described above.

The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof. In some implementations, the second computer 800 may be a DR database system as discussed above.

The storage catalog server 850 may be a server, cloud server, or the like, and may store and/or provide a storage catalog for the database system (e.g., storage catalog 200 shown in FIG. 2). The storage catalog may the LSM metadata associated with a database instance, and may be persisted independently of the actual database. The storage server 850 may use and/or include any suitable combination of any suitable volatile and non-volatile physical storage mediums, including, for example, hard disk drives, solid state drives, optical media, flash memory, tape drives, registers, and random access memory, or the like, or any combination thereof. The storage catalog server 850 may communicate with one or more other computers such as the computer 600, the central component 700, the second computer 800, and shared memory 900.

The shared memory 900 may be any suitable combination of any suitable volatile and non-volatile physical storage mediums, including, for example, solid-state memory, hard disk drives, solid state drives, optical media, flash memory, tape drives, registers, and random access memory, or the like, or any combination thereof. The shared memory may be communicatively coupled to a processor, memory controller, communications interface, and/or one or more computers. The shared memory 900 may store system catalog overrides and/or portions of the system catalog that are retrieved from the storage catalog server 850 at one or more predetermined periods of time.

Data may be stored in any suitable format in, for example, the memory 670, the fixed storage 630, the central component 700, the storage 810, the storage catalog server 850, and/or the shared memory 900 using any suitable filesystem or storage scheme or hierarchy. For example, the central component 700 and/or the storage 810 may store data using a log structured merge (LSM) tree with multiple levels. Further, if the systems shown in FIGS. 4-5 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant. More recent transactions may be stored at the highest or top level of the tree and older transactions may be stored at lower levels of the tree. Alternatively, the most recent transaction or version for each record (i.e., contents of each record) may be stored at the highest level of the tree and prior versions or prior transactions at lower levels of the tree.

The information obtained to and/or from a central component 700 may be isolated for each computer such that computer 600 may not share information with computer

800. Alternatively or in addition, computer 600 may communicate directly with the second computer 800.

The computer (e.g., user computer, enterprise computer, etc.) 600 may include a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 5.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 5 need not be present to practice the present disclosure. The components can be interconnected in different ways from that shown. The operation of a computer such as that shown in FIGS. 4-5 is readily known in the art and is not discussed in detail in this application. Code to implement the present disclosure can be stored in computer-readable storage media such as one or more of the memory 670, fixed storage 630, removable media 650, or on a remote storage location.

FIG. 5 shows an example network arrangement according to an implementation of the disclosed subject matter. Four separate database systems 1200*a-d* at different nodes in the network represented by cloud 1202 communicate with each other through networking links 1204 and with users (not shown). Each of database systems 1200 may be operable to host multiple instances of a database, where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

One or more of the database systems 1200*a*-1200*d* may be used as a master database system, and one or more of the database systems 1200*a*-1200*d* may be used as a DR database system. For example, one or more authorized users of the database systems 1200*a*-1200*d* that are associated with the original tenant may request that a sandbox be created by one of the database systems 1200*a*-1200*d*. The system, for example 1200c, may include at least one storage device, such as in FIG. 6. For example, the storage may include memory 670, fixed storage 630, removable media 650, a storage device included with the central component 700 and/or the second computer 800, and/or one or more storage devices associated with one or more of the database systems 1200*a*-1200*d*.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A system comprising:
a database system to store records and execute one or more database operations;
a storage catalog server that includes a storage catalog to record information about system catalog overrides for active workflows of the database system;
a shared memory, communicatively coupled to the database system and the storage catalog server, to store current system catalog overrides and locks for at least one of a tenant and an index of a first workflow of the database system, wherein the current system catalog overrides include at least a portion of the system catalog overrides and locks that are retrieved by the shared memory from the storage catalog server at a predetermined point in time, and wherein the shared memory includes the current system catalog overrides for at least the first workflow,
wherein the database system performs a check of at least one of index validity and tenant validity for a second workflow or other database operation by checking a state of the current system catalog overrides in the shared memory, and
wherein the system catalog overrides suppress visibility of the respective system catalog changes when the database system determines that at least one of the index and the tenant is invalid based on the current system catalog overrides for the first workflow.

2. The system of claim 1, wherein the storage catalog includes log-structured merge-tree (LSM) metadata associated with an instance of the database system, which persists independently of the database system.

3. The system of claim 2, wherein at least one of the first workflow and the second workflow are selected from the group consisting of: a workflow that includes operations that modify a state of the database system, and a workflow that includes operations that manipulate the LSM metadata.

4. The system of claim 1, wherein the system catalog includes the internal database catalog metadata and relations of the database system, and is persisted through database logging and recovery systems.

5. The system of claim 1, wherein the database system performs a lock conflict check for at least one of an index and tenant for the second workflow or other database operation by checking a state of the current system catalog overrides in the shared memory, and
wherein the database system delays execution of the second workflow or other the other database operation until the completion of the first workflow when the database system determines a lock conflict exists for at least one of the index and the tenant based on the current locks for the first workflow.

6. The system of claim 1, wherein a workflow daemon of the database system sequences a first workflow operation and a second workflow operation of the first workflow.

7. The system of claim 6, wherein the database system acquires any locks needed by at least the first workflow operation and transfers them to the workflow daemon.

8. The system of claim 6, wherein the workflow daemon manages locks for tenants of at least one of the first workflow operation and the second workflow operation, wherein the locks are durably held by the workflow daemon.

9. The system of claim 6, wherein the locks are managed by the workflow daemon for at least one of an index and tenant for the first workflow operation during the first workflow.

10. The system of claim 6, wherein the lock is transferred by the workflow daemon of the database system to the second workflow operation when the first workflow operation is complete.

11. The system of claim 1, wherein a primary lock table is stored in the shared memory, wherein the primary lock table that tracks locks held by at least one of the first workflow and the second workflow.

12. A method comprising:
storing records and executing one or more database operations with a database system;
storing, at a storage catalog server, a storage catalog to record information about system catalog overrides for active workflows of the database system;
storing, in a shared memory communicatively coupled to the database system and the storage catalog server, current system catalog overrides and locks for at least one of a tenant and an index of a first workflow of the database system, wherein the current system catalog overrides include at least a portion of the system catalog overrides and locks that are retrieved by the shared memory from the storage catalog server at a predetermined point in time, and wherein the shared memory includes the current system catalog overrides for at least the first workflow;
performing, at the database system, a check of at least one of index validity and tenant validity for a second workflow or other database operation by checking a state of the current system catalog overrides in the shared memory; and
suppressing visibility of the respective system catalog changes when the database system determines that at least one of the index and the tenant is invalid based on the current system catalog overrides for the first workflow.

13. The method of claim 12, wherein the storage catalog includes log-structured merge-tree (LSM) metadata associated with an instance of the database system, which persists independently of the database system.

14. The method of claim 13, wherein at least one of the first workflow and the second workflow are selected from the group consisting of: a workflow that includes operations that modify a state of the database system, and a workflow that includes operations that manipulate the LSM metadata.

15. The method of claim 12, wherein the system catalog includes the internal database catalog metadata and relations of the database system, and is persisted through database logging and recovery systems.

16. The method of claim 12, further comprising:
performing, at the database system, a lock conflict check for at least one of an index and tenant for the second workflow or other database operation by checking a state of the current system catalog overrides in the shared memory; and
delaying execution of the second workflow or other the other database operation until the completion of the first workflow when the database system determines a lock conflict exists for at least one of the index and the tenant based on the current locks for the first workflow.

17. The method of claim 12, further comprising:
sequencing, at a workflow daemon of the database system, a first workflow operation and a second workflow operation of the first workflow.

18. The method of claim 17, further comprising:
acquiring, at the database system, any locks needed by at least the first workflow operation and transfers them to the workflow daemon.

19. The method of claim 17, further comprising:
managing, at the workflow daemon, locks for tenants of at least one of the first workflow operation and the second workflow operation,
wherein the locks are durably held by the workflow daemon.

20. The method of claim 17, further comprising:
managing, at the workflow daemon, the locks for at least one of an index and tenant for the first workflow operation during the first workflow.

21. The method of claim 17, further comprising:
transferring, at the workflow daemon, the lock to the second workflow operation when the first workflow operation is complete.

22. The method of claim 12, wherein a primary lock table is stored in the shared memory, wherein the primary lock table that tracks locks held by at least one of the first workflow and the second workflow.

* * * * *